United States Patent Office 3,823,085
Patented July 9, 1974

3,823,085
DESORBING PETROLEUM HYDROGENATION CATALYSTS
Joseph E. Kochie, Carteret, N.J., assignor to Foster Wheeler Corporation, Livingston, N.J.
No Drawing. Filed Mar. 28, 1973, Ser. No. 345,827
Int. Cl. C10g 23/02
U.S. Cl. 208—216                5 Claims

ABSTRACT OF THE DISCLOSURE

Solid catalyst is demasked in situ in the hydrogen of petroleum fluids by drastically decreasing the reactor pressure at a rate of approximately one-eighth of the total per hour.

BACKGROUND

In the process of refining and stabilizing petroleum products by catalytic hydrogenation, a common problem is the eventual fouling of the catalyst. This may be caused by compounds formed during the catalytic reaction, or by matter carried into the system by the feeding streams. When this takes place, inferior products are obtained and the catalyst must either be replaced or regenerated. The severity of the process and the composition of the petroleum generally determine the length of time the catalyst will perform satisfactorily.

Herein is described a technique for rejuvenating catalysts the efficiency of which has been retarded by matter which can be removed in situ by means less drastic than the removal to an oven or furnace.

Many petroleum products can be further improved by hydrogenation in the presence of some form of catalyst. The upgrading of paraffins, lubricating oils, fuel oils, illuminating oils, jet fuels, and the like with regard to color, stability, storage characteristics and sulfur and nitrogen content has become quite common. Generally, the reactions are carried out under pressures ranging from 500 to 5000 p.s.i.g. and temperatures of from 400 to 800° F. Under these conditions, the liquid petroleum feed is pumped onto a fixed catalyst bed with a predetermined amount of hydrogen passing through it. In the presence of the catalyst, the addition of molecular hydrogen to unsaturated bonds in organic compounds takes place. Combined sulfur is removed as hydrogen sulphide, nitrogen as ammonia and oxygen as water. The last three invariably form a solution of ammonium polysulphide which is insoluble in the petroleum fractions produced.

The catalysts of concern in this invention are solid tablets or extrusions. Their active metals are mounted on alumina. One group contains nickel oxide anywhere from one to five percent and molybdenum oxides ranging from ten to fifteen percent. The active metals of the other groups are in the form of cobalto-cobaltic oxide, varying between two and five percent, and molybdenum oxides extending over the range from ten to twenty percent. Most of these are available commercially.

Before the catalyst can be used for hydrogenation, it must be preconditioned. A predetermined amount is poured into the reactor and all closures are tightened for pressure operation. As the temperature is increased, the air in the reactor is allowed to further oxidize the active metals. If the reactor is shallow, a small stream of air is introduced to help promote the oxidation.

When the reactor temperature reaches 800° F., the valve in the outlet piping of the reactor is shut and a mixture of 10 vol. percent hydrogen sulphide in hydrogen is started into the reactor at an hourly rate equal to one-fifth of the volume of the reactor. At the end of one hour, the oulet gas is also set to flow at this rate. The sulphiding of the catalyst at 800° F. is allowed to continue in this manner for four hours, maximizing the conversion of nickel, cobalt and molybdenum oxides to the very active metal sulphides.

Following this, a precautionary step is taken to minimize the formation of high molecular weight organic compounds and coke which may mask the catalyst when the feed first comes in contact with it. The reactor temperature is reduced to 500° F. and the feed pump is set to maintain a liquid hourly space velocity of 4.0 (4 volumes of liquid feed per hour per volume of catalyst).

One hour later, the pretreatment of the catalyst is terminated, and the reactor is brought to normal operating conditions. Any variety of petroleum fractions are now hydrogenated including waxes, lubricating oils, jet fuels, illuminating oils, and fuel oils. As the refining continues, a point is reached where product quality diminishes. And, of course, more drastic operating conditions must be restored to. Normally, the temperature and pressure are brought to the limits of design.

However, in performing tests to evaluate catalysts on an almost absolute basis, one set of operating conditions is carried out with fresh preconditioned catalyst to determine an activity datum. If the activity becomes doubtful after operating for some time, these conditions are repeated to appraise the catalyst. In the past, if the activity fell below the datum, the catalyst was replaced.

SUMMARY

By drastically reducing the pressure, it was found that all the catalyst activity could be maintained within tolerable limits and in some instances improved.

Runs, which for various reasons, started with poor product quality were satisfactorily continued to completion after demasking by pressure reduction. Others, which began to indicate difficulty after long production periods, were further extended. Catalyst evaluation runs, which became doubtful following a myriad of operational conditions, correlated better after demasking. At no time during the pressure reduction was the temperature of reactor changed.

The extent to which the pressure should be reduced varies with the type and degree of masking and the rejuvenation desired. Where the catalyst displays a severe drop in activity, the pressure should be lowered to the vaporization point of the feed or even lower if it is permissible. Understandably, some catalysts may be so permanently masked that no amount of pressure lowering will help. In production work, where it may be a matter of slightly improving quality for a short time, a quick mild treatment may suffice.

With some types of masking, lowering the pressure will produce a momentary change in color, sulfur content or other properties which may be far worse than those of the feed. However, upon returning to the normal operating pressure, a marked improvement in product will be observed.

The rate of descent of the reactor pressure is somewhat critical. Fracture of the catalyst has taken place occasionally when the rate was too great. Although the activity of the catalyst was improved, repeated fracturing in this manner would eventually powder the catalyst producing an excessive pressure drop. It has been found that damage to the catalyst is prevented by limiting the pressure lowering to ⅛ of the normal per hour.

Following are examples of catalyst demasking by the reduction of pressure. It is to be understood that these are illustrations only, not limiting the invention in any respect.

EXAMPLE I

Low cold test oils were hydrogenated under various conditions to determine an optimum for the removal of naphthenic acids. pon increasing the temperature from 500 to 550° F. at a 1.0 liquid hourly space velocity (one volume of liquid feed per hour per volume of catalyst) with a gas treat of 1500 s.c.f. (standard cubic feet) of hydrogen per barrel of feed and 500 p.s.i.g., the results did not quite correlate properly. Instead of changing the catalyst to obtain a more consistent value, an attempt was made to improve the efficiency of the catalyst.

The pressure of the reactor was slowly decreased to 100 p.s.i.g. over a period of two hours without changing any of the other conditions. When the pressure was returned to 500 p.s.i.g. a half hour later, the dark product was removed together with an aqueous solution of ammonium polysulphide. The activity of the catalyst was improved as shown in Table I.

TABLE I

| Sample | Feed | 11 | 12 | 13 |
|---|---|---|---|---|
| Reactor temperature, ° F | | 550 | 550 | 550 |
| Reactor pressure, p.s.i.g | | [1]500 | 500 | 500 |
| Space velocity, v./hr./v | | 1.13 | 1.07 | 1.07 |
| $H^2$/oil, s.c.f./bbl | | 1,120 | 1,120 | 1,120 |
| Color density [2] | 737 | 330 | 330 | 264 |
| Sulfur, wt. percent | 1.16 | 0.86 | 0.72 | 0.50 |
| Neutralization No. [3] | 2.64 | 0.276 | 0.207 | 0.207 |
| Gravity, ° API at 60° F | 17.0 | | | 17.6 |
| Viscosity, cs. at 100° F | 83.9 | | | 73.3 |
| Cumulative time, hours | | 199.5 | 222.5 | 248.5 |

[1] Pressure reduced to 100 p.s.i.g. over a period of 2 hours following this sample and then increased to 500 p.s.i.g. within ½ hour.
[2] Foster Wheeler standard.
[3] ASTM D-974 Test (milligrams of KOH per g. of sample).

This data emphasizes the useful principle of this invention in that there was an improvement in color, sulfur and acid removal.

EXAMPLE II

Here a nickel-molybdenum catalyst was used to produce a palatable wax from by-product petroleum wax. It was in the form of $\frac{1}{16}$ inch extrusions which contained 3% nickel oxide and 13% molybdenum oxide mounted on bauxite. The wax feed contained 1.3% oil and had a melting point of 123° F.

After operating with the above-mentioned cold-test oil, a micro-wax, and finally this paraffin wax under a myriad of condition variations, an increase in color density took place. This was an indication that the catalyst had again become deactivated.

In demasking the catalyst, the process was operated in the usual manner except that the pressure was slowly reduced. To prevent catalyst damage, it was dropped to 200 p.s.i.g. at the rate of 100 p.s.i.g. per hour.

TABLE II

| Sample | Feed | 100 | 104 | 107 | 117 |
|---|---|---|---|---|---|
| Reactor temperature, ° F | | 558 | 552 | 550 | 555 |
| Reactor pressure, p.s.i.g | | 600 | [1]600 | 600 | 600 |
| Space velocity, hours | | 1.07 | 1.05 | 0.75 | 1.05 |
| $H^2$/oil, s.c.f./bbl | | 1,150 | 1,370 | 1,500 | 1,000 |
| Color density [2] | 2.60 | 0.63 | 0.64 | 0.35 | 0.14 |
| Gravity, ° API at 60°C | 50.8 | | | | 50.8 |
| Cumulative time, days | | 174.7 | 182.0 | 189.0 | 204.1 |

[1] Pressure dropped to 200 p.s.i.g. over a period of 4 hours following this sample and then brought back to 600 p.s.i.g. within ½ hour.
[2] Foster Wheeler standard.

When the pressure was returned to 600 p.s.i.g., the dark product was drawn off and as the operation continued the color density of the products decreased. Table II illustrates the pertinent data. Seven days after the demasking, the color density changed from 0.64 to 0.35. The wax was definitely getting more transparent. After 22.1 days, it became crystal clear giving a color density of 0.14.

EXAMPLE III

With an increase in the use of higher quality kerosene here and abroad, it has become necessary to seek out new sources for this material. Since the bulk of kerosene produced is of an inferior quality, studies were undertaken in an effort to improve low smoke point kerosenes by hydrogenation.

This investigation was started with a new batch of catalyst. Several reactor conditions were tried when it was decided to make a check run at 700° F., 1000 p.s.i.g. an hourly liquid space velocity of 1.0, and a gas treat ($H_2$/oil) of 3500. The color density immediately rose from 0.034 to 1.65. A day later, it dropped to 0.410 (Sample No. 288, Table III). The operation was continued and after four days without any improvement in the product color, the demasking procedure was undertaken. Sample No. 291 is typical of a product after demasking. It will be noted that the color is much darker (22.0) than that of the feed (4.34).

A distinct improvement in the product was observed when the reactor pressure was brought back to 1000 p.s.i.g. Within three days its color density fell to 0.041. On the following week it was only half of that (0.020).

TABLE III

| Sample | Feed | 288 | 290 | 291 | 293 | 299 |
|---|---|---|---|---|---|---|
| Reactor temperature, ° F | | 685 | [1]699 | 694 | 690 | 629 |
| Reactor pressure, p.s.i.g | | 1,000 | 1,000 | 500 | 1,000 | 1,000 |
| Space velocity, hours | | 0.99 | 0.98 | 0.98 | 1.60 | 1.00 |
| $H^2$/oil, s.c.f./bbl | | 4,130 | 3,350 | 0 | 3,570 | 3,780 |
| Color density [2] | 4.34 | 0.410 | 0.550 | 22.0 | 0.041 | 0.020 |
| Gravity, ° API at 60° F | 36.8 | | | | 37.2 | |
| Cumulative time, days | | 62.7 | 66.5 | 66.6 | 69.9 | 75.6 |

[1] Pressure dropped to 500 p.s.i.g. over a period of 4 hours after this sample and then brought back to 1,000 p.s.i.g. within ½ hour.
[2] Foster Wheeler standard.

This charge of catalyst is still in use and is exhibiting an activity which satisfies the original check run. It has logged 156.5 days after numerous runs and three different kerosene feed stocks.

This invention provides a method for maintaining the activity of a solid catalyst in situ by demasking it of matter which interferes with its functions in the hydrogenation of petroleum liquids.

Said matter is removed from the catalyst when it becomes excessive (as indicated by a darkening of the product or a general decrease in quality) by decreasing the reactor pressure at the rate of approximately ⅛ of the total per hour. Extended periods produce a more complete demasking. Said matter is removed via the product, the feed being pumped continuously. A marked improvement in catalyst activity results when the pressure is returned to normal and the system has been flushed of masking material.

Although the invention has been described with respect to specific embodiments, many variations within the spirit and scope of the invention as defined in the following claims will be apparent to those skilled in the art.

What is claimed is:

1. In the method of refining and stabilizing petroleum products by catalytic hydrogenation wherein liquid petroleum feed is pumped onto a fixed catalyst bed with a predetermined amount of hydrogen passing through it, the catalyst contains an oxide of an active metal of the group consisting of nickel, molybdenum and cobalt mounted on alumina, which is presulphided by hydrogen sulphide introduced with the hydrogen, under pressure ranging from 500 to 5000 p.s.i.g. and temperatures of from 400 to 800° F., in which the activity of the catalyst deteriorates with time, the improvement for maintaining the activity of a solid catalyst in situ after it has lost its activity after a period of operation due to the absorption of catalyst deactivating material, which comprises:

reducing the reactor pressure a rate of approximately one-eighth of the total pressure per hour for about one-half hour to about six hours, while all the other reactor conditions are maintained to a level depending on the degree of demasking required, then increasing the pressure to normal, and continuing to pump feed until the required high quality product has appeared.

2. A method as claimed in claim 1, in which the reaction pressure is increased to normal within approximately one-half hour.

3. A method as claimed in claim 1, in which the pressure is reduced from about 500 p.s.i.g. to about 100 p.s.i.g. over a period of about two hours.

4. A method as claimed in claim 1, in which the petroleum fraction is selected from the group consisting of waxes, lubricating oils, jet fuels, illuminating oils and fuel oils.

5. A method as claimed in claim 1, in which the pressure is reduced to at least the vapor point of the feed.

References Cited
UNITED STATES PATENTS 3,533,960  10/1970  Weinert _____ 208—216
3,761,400  9/1973  Mitchell _____ 208—216

CURTIS R. DAVIS, Primary Examiner

U.S. Cl. X.R.

208—143, 254 H, 255